(12) United States Patent
Barmakian

(10) Patent No.: US 6,244,014 B1
(45) Date of Patent: Jun. 12, 2001

(54) STEEL ROD-REINFORCED PLASTIC PILING

(76) Inventor: Andrew Barmakian, 10084 Big Pine Dr., Alta Loma, CA (US) 91701

(*) Notice: Subject to any disclaimer, the term of this patent is extended or adjusted under 35 U.S.C. 154(b) by 0 days.

(21) Appl. No.: 09/360,281

(22) Filed: Jul. 22, 1999

(51) Int. Cl.$^7$ .................................................. E04C 3/30
(52) U.S. Cl. ........................................................... 52/736.3
(58) Field of Search .................................. 52/737.1, 737.4, 52/738.1, 721.4, 736.1, 736.3, 40, 169.14, 169.13; 405/231, 256, 257

(56) References Cited

U.S. PATENT DOCUMENTS

| | | | |
|---|---|---|---|
| 3,449,918 | * | 6/1969 | Fuentes ................................ 52/737.1 |
| 3,501,920 | * | 3/1970 | Uchiyama ........................... 52/737.1 |
| 3,798,867 | * | 3/1974 | Starling .................................... 52/724 |
| 3,984,989 | * | 10/1976 | Turzillo ............................... 52/742 X |
| 4,132,082 | * | 1/1979 | Merjan ................................ 52/170 X |
| 4,842,447 | * | 6/1989 | Lin ......................................... 405/243 |
| 5,051,285 | | 9/1991 | Borzakian . |
| 5,180,531 | | 1/1993 | Borzakian . |
| 5,542,785 | * | 8/1996 | Cloud .................................... 405/239 |
| 5,761,875 | * | 6/1998 | Oliphant et al. ..................... 52/721.2 |
| 5,766,711 | | 6/1998 | Barmakian . |

* cited by examiner

Primary Examiner—David M. Purol
(74) Attorney, Agent, or Firm—Sheldon & Mak

(57) ABSTRACT

An elongated composite structural member having a cross-sectional area of at least 80 square inches includes a rigid cage having a parallel spaced plurality of main rod members in a circularly spaced array, the main rod members being formed steel reinforcing bars; a secondary rod member being a formed steel reinforcing bar having a plurality of helical loop elements contacting inwardly facing locations on each main rod member; and welded rigid connections being formed between the main rod members and the secondary rod member at not less than 30 percent of the contacting locations. A circularly cylindrical plastic body encapsulates and substantially solidly fills the rigid cage with the main rod members approximately equally spaced from an outside surface of the plastic body, wherein at least 90 percent by weight of the plastic body consists of a main polymeric component and an additive component, the main polymeric component consisting of low-density polyethylene of which at least 60 percent is linear low density polyethylene, the additive component including an effective amount of an ultraviolet inhibitor. In one preferred form having an outside diameter of 13 inches and an overall length of from 10 to 60 feet, the main rod members are approximately 1 inch diameter steel bars, the secondary rod member is an approximately 0.4 inch diameter formed steel reinforcing rod, the main rod members being spaced approximately ¾ inch within the outside diameter. Also disclosed is a method for forming a structural plastic member.

24 Claims, 3 Drawing Sheets

STEEL ROD-REINFORCED PLASTIC PILING

BACKGROUND

The present invention relates to elongated structural members such as pilings, poles and columns, and methods for making such members.

Concrete, steel, and wood are conventionally used for pilings, telephone poles, and the like. However, each of these materials has disadvantages. Concrete and steel pilings are heavy and awkward to maneuver. Neither concrete nor steel pilings make good fender pilings because neither is "forgiving" when impacted. Under impact steel bends and buckles and concrete shatters. Both concrete and steel pilings are expensive to repair. -Furthermore, steel, either standing alone or as a reinforcement in porous concrete, is subject to corrosion.

Wood pilings are plagued by wear and tear and are attacked by wood-boring marine organisms. Wood pilings are typically treated with creosote, but even this material can be ineffective against modern marine borers. These marine borers can only be stopped by wrapping the wood pilings in plastic coverings. However, these plastic coverings cannot withstand much wear and tear, especially abrasion from normal vessel contact. So in addition to a thin plastic wrap, wooden fender piles often require thick plastic wrappings, which are expensive to put in place. Wood used for telephone poles is subject attack from environmental hazards such as woodpeckers, and in desert locations, there can be severe erosion from sandstorms.

Composite pilings are also known, being disclosed for example in U.S. Pat. No. 5,180,531 to Borzakian, that document being incorporated herein by this reference. The '531 patent discloses a plastic pipe having an inner pipe core or mandrel being 6 inches or less in diameter, and a substantially homogenous coating being at least two inches thick. The thick plastic coating provides the bulk of the mechanical strength, being formulated with a desired combination of flexibility, brittleness, and impact resistance for use as pilings including fender pilings of docks, telephone poles, light standards, etc. The plastic pipe of the prior art is not entirely satisfactory in that uniform thick coatings that are free of voids are somewhat difficult to achieve, and longer lengths of the pilings such as from 20 feet to 60 feet normally require assembly of shorter length segments, with consequent degradation of structural and environmental integrity and increased cost of fabrication. Also, when the plastic pipe is provided with the homogenous plastic coating having with a desired flexibility and impact resistance for fender piling applications, the bending strength is less than desired for withstanding side loads that are produced by contact with approaching vessels.

U.S. Pat. No. 5,766,711 to Barmakian discloses a composite camel structure including a pipe mandrel and a thermally bonded plastic cushion surrounding the mandrel, that patent being incorporated herein by this reference. A mold having the mandrel centered therein is filled with molten plastic, the plastic being cooled and solidified by feeding water into the mandrel for progressively solidifying the cushion member along mandrel for producing a thermal bond without excessive tensile strain in the plastic material, thereby to achieve a substantially unbroken outside surface. Although the use of cooling water inside the mandrel reduces the likelihood of cracks and voids in the cushion material, the pipe mandrel is undesirably expensive, and pilings having pipe encapsulated in plastic have structural disadvantages as discussed above.

In view of these problems with conventional pilings and telephone poles, there is a need for pilings and telephone poles that have a long life, are easily installed, environmentally sound, durable in use, and having high bending strength.

SUMMARY

The present invention meets this need by providing a steel-reinforced plastic piling that has particularly high bending strength. In one aspect of the invention, an elongated composite structural member having a cross-sectional area of at least 50 square inches includes a rigid cage including a parallel spaced plurality of main rod members that are connected by a plurality of loop elements, portions of each main rod member being rigidly connected to at least 30 percent of the loop elements; and a cylindrical plastic body encapsulating the rigid cage.

Preferably the loop elements can contact inwardly facing portions of at least some of the main rod members for preventing locally inward movement of the main rod members within the material of the plastic body when the structural member is heavily loaded in bending. Each of the main rod members is preferably rigidly connected to substantially all of the loop elements. The structural plastic member can include a secondary rod member forming the plurality of loop elements. The secondary rod member can be helically formed.

The main rod members and the loop elements can be formed steel reinforcing bars, the rigid connections being welded connections. The main rod members can be in a circularly spaced array, the plastic body being circularly cylindrical, the main rod members being approximately equally spaced from an outside surface of the plastic body. The main rod members can have a nominal diameter of between approximately 4 percent and approximately 10 percent of an outside diameter of the plastic body, the loop elements having a nominal diameter of between 30 percent and approximately 70 percent of the diameter of the main rod members. The loop elements can define a secondary rod envelope, the loop elements having a pitch spacing being approximately half of an outside diameter of the secondary rod envelope.

Preferably the plastic body sealingly surrounds the cage, having a thickness of not less than approximately 4 percent of the outside diameter of the plastic body over each of the main rod members and the loop elements. The outside diameter of the plastic body can be approximately 13 inches, the diameter of the main rod members being approximately 1 inch, the diameter of the loop elements being approximately 0.4 inch diameter, and the loop elements defining a secondary rod envelope having an outside diameter of approximately 9.5 inches. Adjacent ones of the main rod members can be equally spaced.

The plastic body can solidly fill the rigid cage. The plastic body can consist of a main polymeric component and an additive component, the main polymeric component consisting of low-density polyethylene of which at least 60 percent is linear low density polyethylene, the additive component including an effective amount of an ultraviolet inhibitor.

In another aspect of the invention, an elongated composite structural member having a cross-sectional area of at least 80 square inches includes the parallel spaced plurality of main rod members; and the cylindrical plastic body encapsulating the main rod members, each of the main rod members being spaced at least 0.5 inch within an outside contour of the plastic body, wherein the plastic body consists of a main polymeric component and an additive component, the main polymeric component consisting of low-density polyethylene of which at least 60 percent is linear low density polyethylene, the additive component including an effective amount of an ultraviolet inhibitor. Preferably the main polymeric component is at least 90 percent of the plastic body for enhanced resistance to cracking of the material during cooling following the molding process, the plastic body including not more than 5 percent by weight of high-density polyethylene.

In a further aspect of the invention, a method for forming a structural plastic member includes:

(a) helically forming a rod member to have a plurality of loop elements;

(b) welding a parallel spaced plurality of main rod members to the outside of each of the loop elements to form a welded cage; and (c) encapsulating the welded cage in a plastic body.

The encapsulating can include:

(a) providing an injection mold having an elongate cylindrical cavity;

(b) loading the mold with the welded cage;

(c) centering the welded cage within the mold;

(d) injecting a polymeric composition into the mold thereby covering the core element; and (e) cooling the mold to form the structural plastic member.

Preferably the injecting includes formulating the polymeric composition to consist of low density polyethylene, at least 60 percent of the polymeric composition being linear low-density polyethylene for resisting cracking of the material.

DRAWINGS

These and other features, aspects, and advantages of the present invention will become better understood with reference to the following description, appended claims, and accompanying drawings, where:

DESCRIPTION

Figure 1:
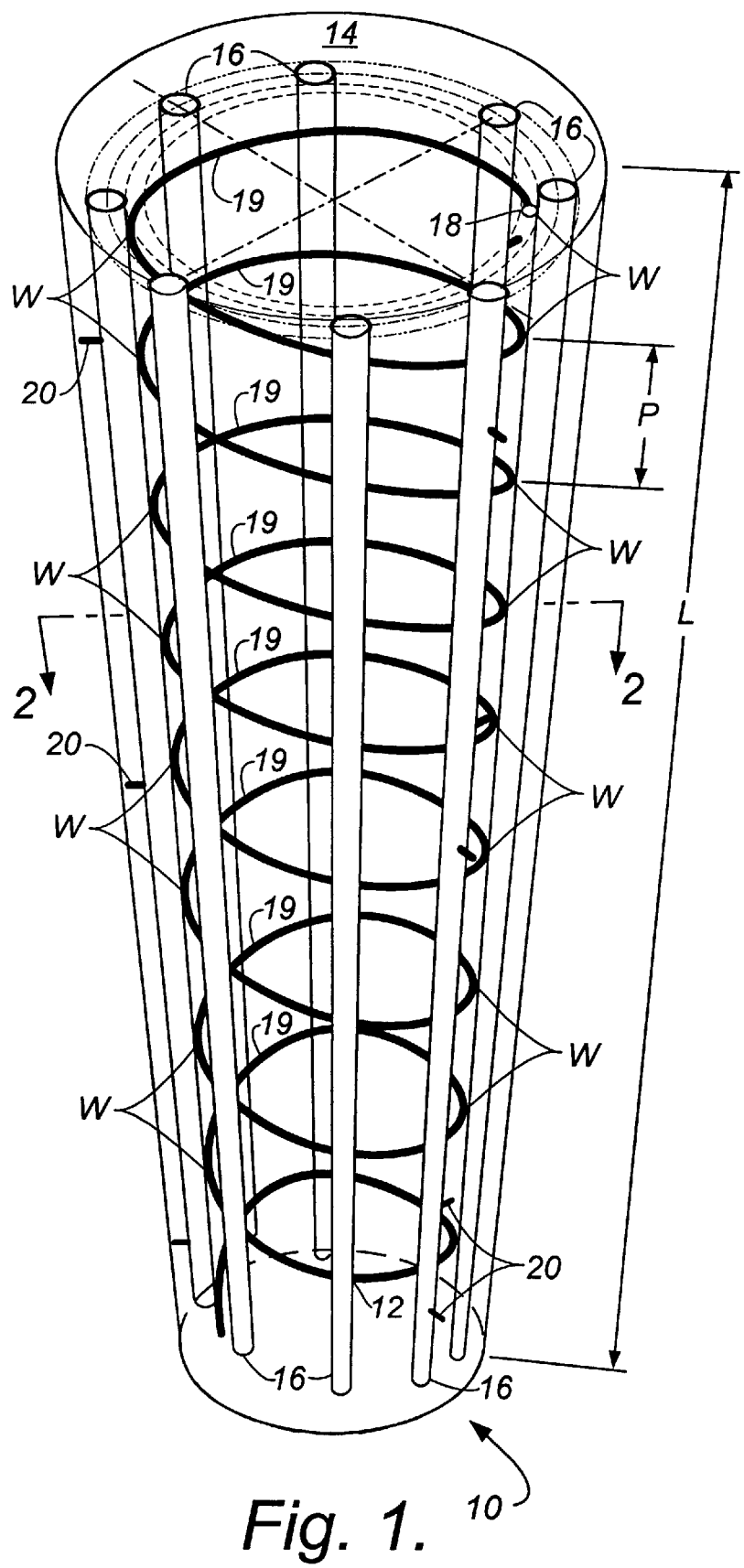
FIG. 1 is a phantom perspective view of a reinforced plastic piling structure according to the present invention.
Figure 2:
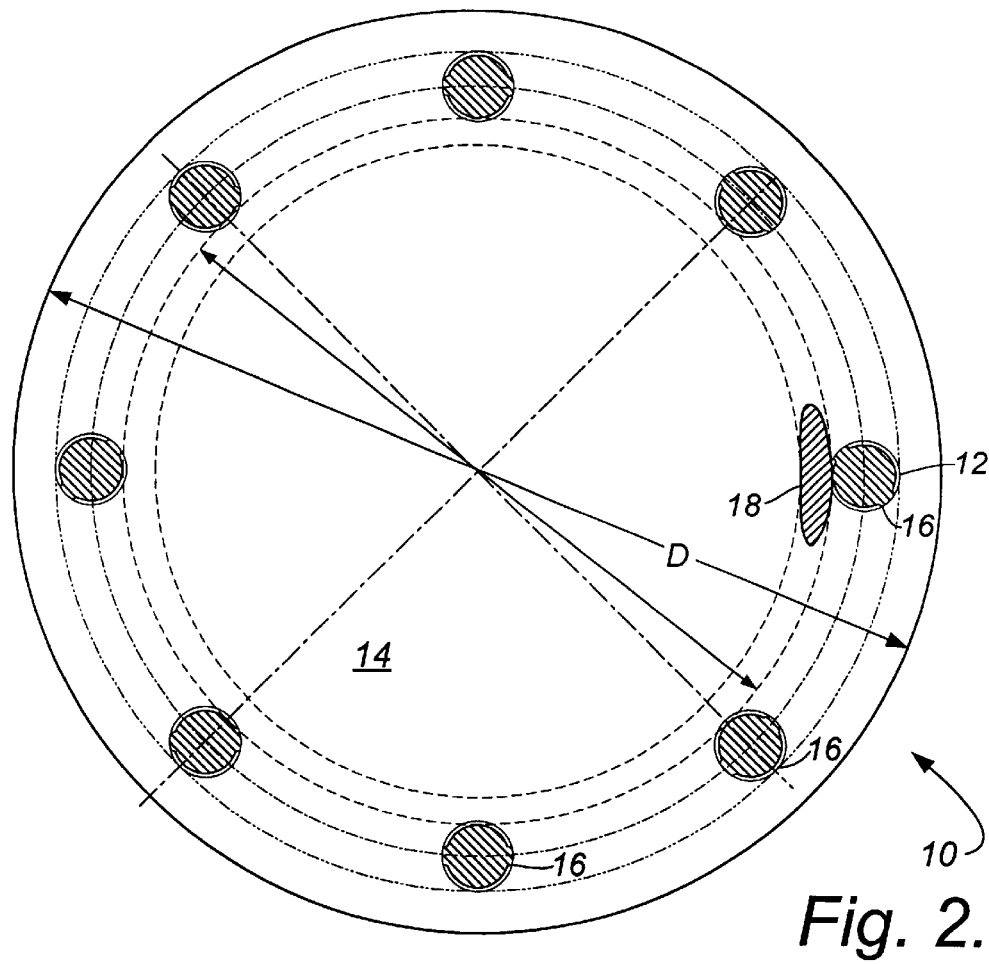
FIG. 2 is a vertical sectional view of the piling structure of FIG. 1 taken on line 2—2 therein.
Figure 3:
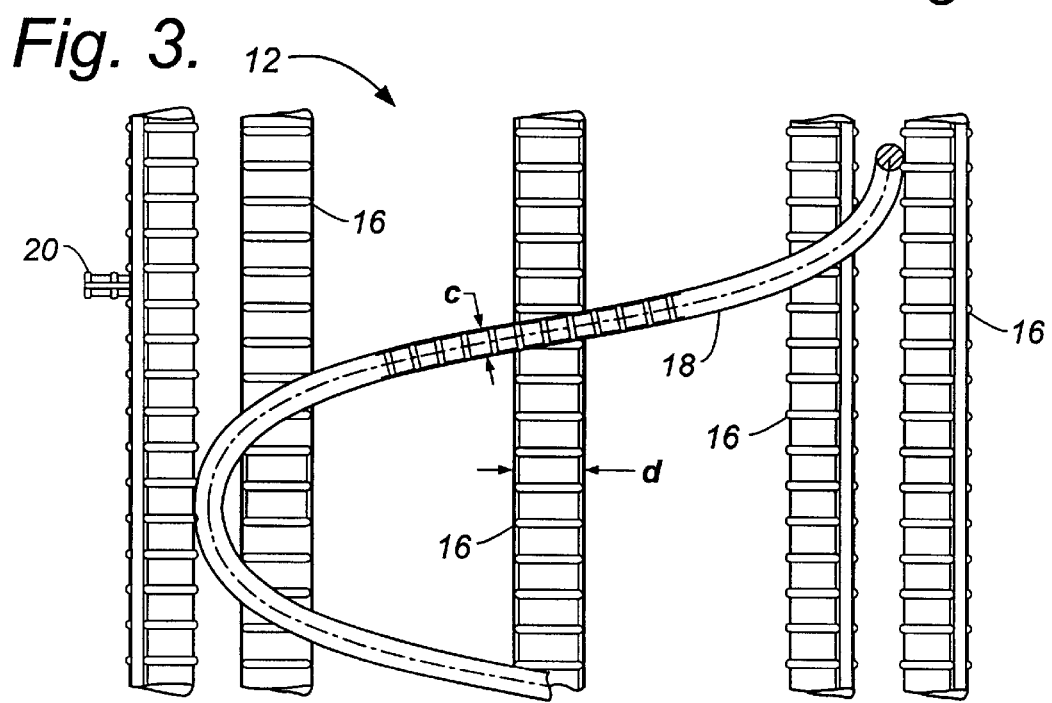
FIG. 3 is a lateral sectional view of a cage portion of the piling of FIG. 1.

The present invention provides a novel reinforced plastic member that is particularly effective as a plastic piling, telephone pole or other structural element. With reference to FIGS. 1–4, a plastic piling 10 according to the present invention includes an elongate rigid cage 12 and a resilient plastic material forming a cylindrical plastic body 14 and encapsulating the cage 12. As shown in FIGS. 1 and 2, an exemplary configuration of the piling 10 is generally circularly cylindrical, having an outside diameter D that is typically 13 inches, and a length L that can be from approximately 10 feet to approximately 60 feet, or even longer. As used herein, the term "cylindrical" means having a surface that is generated by a straight line that moves parallel to a fixed line. Thus, although the body 14 is shown in the drawings as circularly cylindrical, other cross-sectional shapes such as elliptical, polygonal, and rounded polygonal are also contemplated within the scope of the present invention.

The cage 12 includes a plurality of longitudinal bar members 16 that are rigidly interconnected by a spiral member 18 having a plurality of loop elements 19 that each contact inwardly facing portions of each of the bar members 16. By contacting the inwardly facing portions of the main rod members 16, the loop elements 19 advantageously prevent inward movement of the rod members 16 when the piling 10 is subjected to bending loads. Further, the cage 12 is preferably a weldment wherein the main rod members 16 are not only additionally restrained from movement outwardly of the loop elements 16 but also the cage 12 is rigidly resistant to bending loading that would otherwise produce axial and/or angular movement of the main rod members 16 relative to the loop elements 19. Accordingly, a substantial proportion of the loop elements 19 are welded to each of the rod members 16 as indicated at W in the drawings. In applications wherein bending loading is not severe, each of the main rod members 16 is welded to approximately one of every three of the loop elements 19 for forming the cage 12 as a rigid weldment. When higher loads are contemplated, a greater proportion of the loop elements are welded to each main rod member. Preferably in applications having severe bending loads, each of the loop elements 19 is welded to every one of the main rod members 16.

In FIG. 2, there are eight of the main rod members 16 making equally spaced contact at a core diameter C about the helical form of the secondary rod member 18, the diameter C corresponding to a secondary rod envelope of the loop elements 19. The rod members 16 and 18 are formed steel reinforcing rods, and short lengths of the material of the secondary rod 18, designated projections 20 are welded in outwardly extending relation at spaced locations on the cage 12 for facilitating centering of the cage in a mold as described below. As shown in FIG. 1, there are three rows of the projections 20, the projections of each row being sufficiently closely spaced to support the cage 12 in a generally horizontal orientation without significant sagging.

In a preferred configuration wherein the outside diameter D is approximately 13 inches, the core diameter C can be between approximately 9 inches and approximately 10 inches, the main rods 16 being nominally 1 inch in diameter, a combination that provides a radial thickness T of approximately 0.75 inches of the plastic body 14 outside of the cage 12. In this combination, the secondary rod member can be nominally ⅜ inch in diameter. A suitable spacing or pitch P of the loop elements 19 is approximately 5 inches, or about half of the core diameter C. Two experimental prototypes in this configuration have been tested under simulated flexural loading, the results being presented below in Table I.

TABLE I

Experimental Flexural Test Results

| No. | Meas. EI × $10^9$ lb-in$^2$ | Strain × $10^{-6}$ | Deflect inches | Load[1] kips | Result | Residual[2] Deflection inches |
|-----|------------------------------|--------------------|----------------|----------------|------------------|-------------------------------|
| 1 | 2.55 | 18,000 | 27 | 22 | Rebar rupture | 36[4] |
| 2 | 2.45 | 19,000 | 36 | 22 | Deflection limit[3] | 23 |

[1]Total Forces applied by hydraulic ram.
[2]Permanent deflection remaining after load is removed.
[3]Load cycling.
[4]Exceeded deflection limits after loss of load carrying capacity.

The results compare favorably with a similar construction not having the secondary rod member 18 that failed by rebar debonding at a load of only 9 kips. The tested samples also compared favorably with a pair similarly constructed specimens having larger main rod members (1.25 inches in diameter), those specimens carrying a load of 23 kips at failure. One of the specimens had a measured EI stiffness of only $0.95 \times 10^9$ lb-in$^2$, failing by rebar rupture, the other having a measured EI of only $0.88 \times 10^9$ lb-in$^2$. Another specimen substituting a 6-inch diameter Schedule 40 steel pipe for the main rod members failed by pipe buckling at a load of 11 kips and had a measured EI of $1.14 \times 10^9$ lb-in$^2$.

In a variety of applications, it is contemplated that the outside diameter D can be from approximately 8 inches to approximately 24 inches, the piling having a cross-sectional area of approximately 50 square inches. The main rod diameter d can be from approximately 0.4 inch to about 1.5 inches, and the secondary rod diameter c can be from about 0.25 inch to about 0.75 inch. Practical combinations of these dimensions include the main rod diameter d being from approximately 4% to approximately 10% of D, the secondary rod diameter c being from 30% to 70% of the main rod diameter d.

An important feature of the present invention is a formulation of polymeric material that is suitable for encapsulating the cage 12 and that does not form voids and cracks due to tensile thermal strains being generated during solidification. This problem is exacerbated by the absence of a tubular mandrel that can receive cooling water as disclosed in the camel structure of the above-referenced '711 patent. It has been discovered that a particularly suitable composition for forming the plastic body 14 as an uninterrupted covering of the cage 12 is a main first quantity of low density polyethylene of which at least 60 percent and preferably 65 percent is linear low-density polyethylene (LLDPE), the balance being regular low-density polyethylene (LDPE), and a process additive second quantity including an effective amount of UV inhibitor, the composition not having any significant volume of filler material such as calcium carbonate. Preferably, the first quantity is at least 90 percent of the total volume of the plastic body 14, approximately 5 percent of the total volume being a mixture of coloring, foaming agent, and UV inhibitor. Preferably the composition is substantially free (not more than 5 percent) of high density polyethylene.

Thus the composition of the cushion member 14 has polymeric elements being preferably exclusively polyethylene as described above (substantially all being of low-density and mainly linear low-density), together with process additives as described below. As used herein, the term "process additive" means a substance for enhancing the properties of the polymeric elements, and does not include filler material such as calcium carbonate. The composition preferably contains a process additive which can be a foaming or blowing agent in an amount of up to about 0.9% by weight to insure than when the plastic body 14 is made by extruding the plastic composition into a mold, the mold is completely filled. The foaming agent can be a chemical blowing agent such as azodicarbonamide. A suitable chemical blowing agent is available from Uniroyal of Middlebury, Conn., under the trade name Celogen AZ 130.

Other process additives of the composition can include a coupling agent, preferably a silane, for improved bonding between the plastic body 14 and the cage 12.

The plastic composition can also include a fungicide, typically in an amount of about 0.25% by weight, and an emulsifier, in an amount of from about 0.1% to 0.3% by weight. The use of emulsifier improves surface appearance of the product.

The composition can also contain a carbon black, generally a furnace black, as a colorant, to improve the physical properties, and as a UV stabilizer. The amount of carbon black used is generally about 2.5% by weight.

Figure 5:
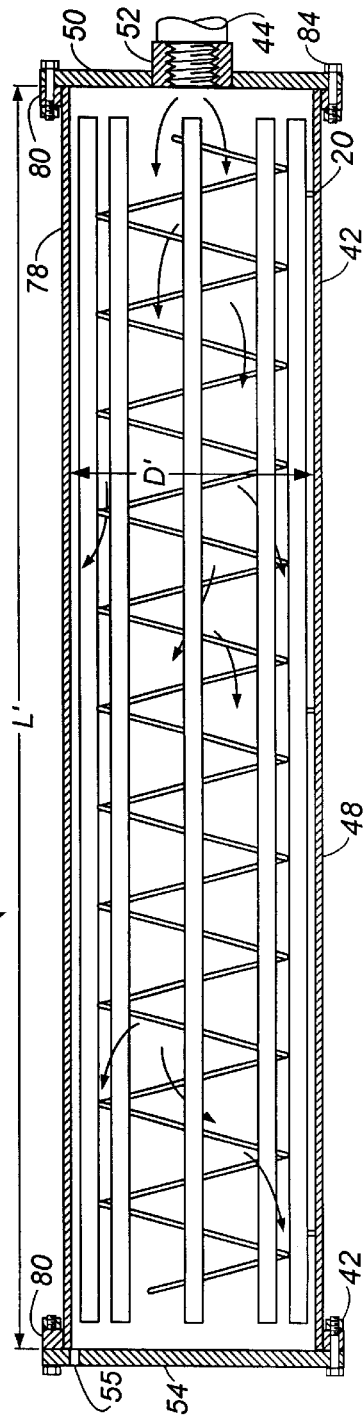
FIG. 5 is a detail sectional view of a side portion of the piling structure of FIG. 1, showing a filled temporary cavity associated with a locating protrusion of the cage portion.

With further reference to FIG. 5, a mold apparatus 40 for encapsulating the cage 12 to form the plastic body 14 of the piling 10 includes a mold assembly 42 and a conventional extruder press having an outlet 44. The mold assembly 42 includes a flanged tubular mold segment 48, an inlet plate 50 having an injection point 52 for connection to an outlet of the extruder press, and a cover plate 54 having an exhaust vent 55.

As further shown in FIG. 5, the mold segment 48 has an inside diameter D' and a length L', being a weldment of a mold tube 78 and a pair of perforate flanges 80. The diameter D' and the length L' of the mold segment 48 correspond to the diameter D and length L of the piling structure 10, but with allowance for shrinkage of the material of the plastic body 14. For example, with the inside diameter D' being 13.25 inches, the outside diameter D subsequent to cooling of the plastic body 14 is approximately 13.0 inches. Respective pluralities of flange fasteners 84 provide removable connections between the flanges 80 and the corresponding inlet and cover plates 50 and 54. Suitable materials for the mold tube 78 and the flanges 80 include mild steel of 0.25 inch and 1 inch thickness, respectively. It will be understood that additional counterparts of the mold segment 48 can be connected end-to-end with the segment 48 for selectively varying the length L of the piling 10.

Also shown in FIG. 5 is the cage 12 centered within a main cavity 60 of the mold assembly 42, being supported by a plurality of the projections 20. The projections 20 are provided in three angularly spaced rows as shown in FIG. 1 for avoiding a requirement to keep the core within a limited angular position until the molding process is complete. Alternatively, the mold assembly can be provided with a plurality of centering screws as described in the above-referenced '711 patent, provided that a suitable detent or other means for keeping the cage 12 laterally restrained on the screws is included.

Figure 6:
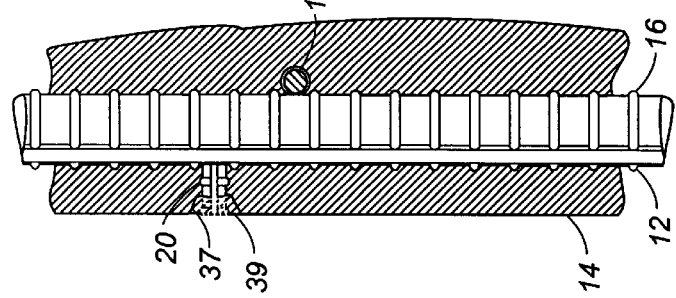
FIG. 6 is a flow chart for a process of forming the piling structure of FIG. 1.

With further reference to FIG. 6, a molding process 100 for forming the camel structure 10 includes a load mold step 102 wherein the cage 12 is placed within the mold assembly 42 with opposite ends thereof equally spaced between opposite flanges 80 of the mold assembly 42, the cage 12 being coaxially centered within the mold tube 78 by the projections 20. Then, the inlet and cover plates 50 and 54 are installed in a close mold step 104 and, optionally in an incline mold step 106, the mold assembly 42 is propped up on a suitable support for elevating the exhaust vent 55.

Next, the material of the plastic body 14 is fed into the main cavity 60 in an inject body step 108. Then in a cooling step 110, the mold assembly 42 with its contents is submerged in cooling water for solidifying the material of the plastic body 14, after which the assembly 42 is removed from the water (step 112), opened and the substantially complete piling 10 is withdrawn (step 114). Finally, exposed end portions of the projections 20 are removed (step 116) by suitable means such as grinding, and the plastic body 14 at those locations is filled flush and sealed using a suitable adhesive plastic material in a fill step 118 as shown in FIG. 4.

Figure 4:
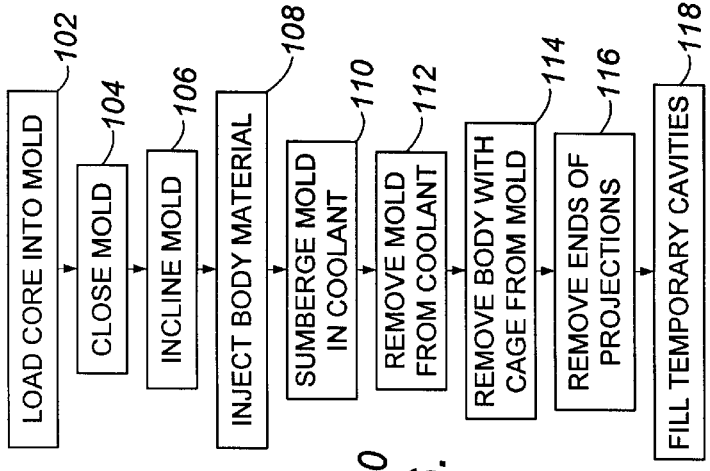
FIG. 4 is a lateral sectional view of a mold assembly for making the plastic piling of FIG. 1, illustrating the flow of extruded plastic within and around the cage portion in forming the piling structure of FIG. 1.

FIG. 4 shows one of the projections 20 being forshortened, a temporary cavity 37 being created, and a sealing closure 39 filling the temporary cavity 37.

If desired or needed, the cage 12 and/or the mold assembly 42 can be preheated to be certain that the plastic material of the cushion member 14 flows to the cover plate 54 of the mold assembly 42 and completely fills the main cavity 60.

The piling 10 of the present invention is immune to marine borer attack, and thus requires no further protection, such as creosote or plastic sheathing, being practically maintenance free. The piling 10 is abrasion resistant, and thus has excellent effectiveness as a marine fender piling without any added protective covering.

The composite piling 10 is chemically inert, so it can last indefinitely. It does not react with sea water, is corrosion free, is substantially immune to the effects of light, is not bothered by most petroleum products, and is not subject to dry rot. Because it can be made with recycled plastic, it is an environmentally sound investment.

In some military based naval applications, it is undesirable for a piling to be electro-magnetically sensitive. In such applications the cage 12 can be formed with non-magnetic materials, such as carbon-reinforced plastic. The cage 12 can also be developed by using fiberglass reinforcing rods, with reinforced epoxy joints at points of contact between the main rods 12 and the loop elements 19 of the spiral member 18.

Although the present invention has been described in considerable detail with reference to certain preferred versions thereof, other versions are possible. For example, the main rods 16 can be formed having a flattened or elongate cross-section that is preferably circumferentially oriented relative to the plastic body 14. A counterpart of the spiral member 18 can be formed by members having diagonal segments being connected between adjacent ones of the main rods 16 in applications having relatively light bending loads the reinforcement of the plastic body 14 can be provided entirely by the main rods 16. Therefore, the spirit and scope of the appended claims should not necessarily be limited to the description of the preferred versions contained herein.

What is claimed is:

1. An elongated composite structural member having a cross-sectional area of at least 50 square inches, comprising:
   (a) a rigid cage including a parallel spaced plurality of main rod members, the main rod members being connected by a plurality of loop elements, portions of each main rod member being rigidly connected to at least 30 percent of the loop elements, the rigid connections being welded connections; and
   (b) a cylindrical plastic body encapsulating the rigid cage.

2. The structural plastic member of claim 1, wherein the loop elements contact inwardly facing portions of at least some of the main rod members.

3. The structural plastic member of claim 1, wherein each of the main rod members is rigidly connected to substantially all of the loop elements.

4. The structural plastic member of claim 1, comprising a secondary rod member forming the plurality of loop elements.

5. The structural plastic member of claim 4, wherein the secondary rod member is helically formed.

6. The structural plastic member of claim 1, wherein the main rod members and the loop elements are formed steel reinforcing bars.

7. The structural plastic member of claim 6, wherein the main rod members are in a circularly spaced array, the plastic body being circularly cylindrical, the main rod members being approximately equally spaced from an outside surface of the plastic body.

8. The structural plastic member of claim 7, wherein the main rod members have a nominal diameter of between approximately 4 percent and approximately 10 percent of an outside diameter of the plastic body, and the loop elements have a nominal diameter of between 30 percent and approximately 70 percent of the diameter of the main rod members.

9. The structural plastic member of claim 8, wherein the loop elements define a secondary rod envelope, the loop elements having a pitch spacing being approximately half of an outside diameter of the secondary rod envelope.

10. The structural plastic member of claim 8, wherein the plastic body sealingly surrounds the cage, having a thickness of not less than approximately 4 percent of the outside diameter of the plastic body over each of the main rod members and the loop elements.

11. The structural plastic member of claim 8, wherein the outside diameter of the plastic body is approximately 13 inches, the diameter of the main rod members is approximately 1 inch, the diameter of the loop elements is approximately 0.4 inch diameter, and the loop elements define a secondary rod envelope having an outside diameter of approximately 9.5 inches.

12. The structural plastic member of claim 7, wherein adjacent ones of the main rod members are equally spaced.

13. The structural plastic member of claim 1, wherein the plastic body solidly fills the rigid cage.

14. The structural plastic member of claim 1, wherein the plastic body consists of a main polymeric component and an additive component, the main polymeric component consisting of low-density polyethylene of which at least 60 percent is linear low density polyethylene, the additive component including an effective amount of an ultraviolet inhibitor.

15. The structural plastic member of claim 1, wherein each of the main rod members is spaced at least 0.5 inch within an outside contour of the plastic body.

16. The structural plastic member of claim 15, wherein the main polymeric component is at least 90 percent of the plastic body, the plastic body including not more than 5 percent by weight of high-density polyethylene.

17. An elongated composite structural member having a cross-sectional area of at least 80 square inches, comprising:
   (a) a rigid cage including:
      (i) a parallel spaced plurality of main rod members in a circularly spaced array, the main rod members being formed steel reinforcing bars;
      (ii) a secondary rod member being a formed steel reinforcing bar having a plurality of helical loop elements contacting inwardly facing locations on each main rod member; and (iii) welded rigid connections being formed between the main rod members and the secondary rod member at not less than 30 percent of the contacting locations; and (b) a circularly cylindrical plastic body encapsulating and substantially solidly filling the rigid cage with the main rod members approximately equally spaced from an outside surface of the plastic body, wherein at least 90 percent by weight of the plastic body consists of a main polymeric component and an additive component, the main polymeric component consisting of low-density polyethylene of which at least 60 percent is linear low density polyethylene, the additive component including an effective amount of an ultraviolet inhibitor.

18. The structural plastic member of claim 17, wherein the main rod members are approximately 1 inch diameter steel bars, the secondary rod member is an approximately 0.4 inch diameter formed steel reinforcing rod, the helical form of the secondary rod member has an outside diameter of approximately 9.5 inches and a pitch being approximately 5 inches, and the plastic body has an outside diameter of approximately 13 inches.

19. A method for forming a structural plastic member, comprising:

(a) helically forming a rod member to have a plurality of loop elements;

(b) welding a parallel spaced plurality of main rod members to the outside of each of the loop elements to form a welded cage; and (c) encapsulating the welded cage in a plastic body.

20. The method of claim 19, wherein the encapsulating comprises:

(a) providing an injection mold having an elongate cylindrical cavity;

(b) loading the mold with the welded cage;

(c) centering the welded cage within the mold;

(d) injecting a polymeric composition into the mold thereby covering the core element; and (e) cooling the mold to form the structural plastic member.

21. The method of claim 20, wherein the injecting comprises formulating the polymeric composition to consist of low density polyethylene, at least 60 percent of the polymeric composition being linear low-density polyethylene.

22. An elongated composite structural member having a cross-sectional area of at least 50 square inches, comprising:

(a) a rigid cage including a parallel spaced plurality of main rod members, the main rod members being connected by a plurality of loop elements being spaced along substantially a full length of the main rod members, portions of each main rod member being rigidly connected to at least 30 percent of the loop elements, wherein the loop elements extend proximate inwardly facing portions of the main rod members; and (b) a cylindrical plastic body encapsulating the rigid cage.

23. The structural plastic member of claim 22, wherein the rigid connections are welded connections.

24. The structural plastic member of claim 22, comprising a helical secondary rod member forming the plurality of loop elements.

* * * * *